United States Patent
Pinho et al.

(10) Patent No.: US 12,386,672 B2
(45) Date of Patent: Aug. 12, 2025

(54) INTELLIGENT ORCHESTRATION OF CLASSIC-QUANTUM COMPUTATIONAL GRAPHS

(71) Applicant: Dell Products L.P., Round Rock, TX (US)

(72) Inventors: Rômulo Teixeira de Abreu Pinho, Rio de Janeiro (BR); Victor Fong, Medford, MA (US); Kenneth Durazzo, Morgan Hill, CA (US)

(73) Assignee: Dell Products L.P., Round Rock, TX (US)

(*) Notice: Subject to any disclaimer, the term of this patent is extended or adjusted under 35 U.S.C. 154(b) by 559 days.

(21) Appl. No.: 17/648,065

(22) Filed: Jan. 14, 2022

(65) Prior Publication Data

US 2023/0229514 A1    Jul. 20, 2023

(51) Int. Cl.
*G06F 9/50*    (2006.01)
*G06F 9/48*    (2006.01)
*G06N 10/60*   (2022.01)

(52) U.S. Cl.
CPC ............ *G06F 9/505* (2013.01); *G06F 9/4887* (2013.01); *G06N 10/60* (2022.01)

(58) Field of Classification Search
CPC ...... G06F 9/505; G06F 9/4887; G06F 9/5005; G06N 10/60; G06N 10/20; G06N 10/80
See application file for complete search history.

(56) References Cited

U.S. PATENT DOCUMENTS

| | | | | |
|---|---|---|---|---|
| 2001/0032029 A1* | 10/2001 | Kauffman | ........ | G06Q 10/06316 700/106 |
| 2005/0288030 A1* | 12/2005 | Choi | ..................... | H04L 5/0067 455/450 |
| 2008/0116449 A1* | 5/2008 | Macready | .............. | G06N 10/20 257/31 |

(Continued)

OTHER PUBLICATIONS

Killoran, N., et al., "What would you do with 1000 QPUs?," retrieved at https://medium.com/xanaduai/what-would-you-do-with-1000-qpus-4d6b91eccb69, Feb. 18, 2020, pp. 9.

(Continued)

*Primary Examiner* — Tuan C Dao
(74) *Attorney, Agent, or Firm* — Workman Nydegger

(57) ABSTRACT

One example method includes receiving a computation workflow defined by a graph that includes quantum computing nodes, receiving a catalogue of quantum computing instances that are available in a hybrid classic-quantum computation infrastructure, transforming the graph to create a first graph transformation, and each of the quantum computing nodes is assigned a respective candidate resource allocation that identifies candidate resources operable to execute a respective quantum algorithm associated with that quantum computing node, and the transforming is performed using information from the catalogue, and optimizing the computation workflow by selecting, for each of the quantum computing nodes, a resource from the candidate resource allocation associated with that quantum computing node, and the optimizing includes transforming the first graph transformation to create a second graph transformation that specifies the selected resources for each node.

18 Claims, 6 Drawing Sheets

(56) References Cited

U.S. PATENT DOCUMENTS

| | | | |
|---|---|---|---|
| 2009/0122706 A1* | 5/2009 | Alfano | H04L 41/046 370/252 |
| 2012/0192168 A1* | 7/2012 | Funaoka | G06F 8/433 717/140 |
| 2014/0229221 A1* | 8/2014 | Shih | G06Q 10/06312 705/7.23 |
| 2016/0163311 A1* | 6/2016 | Crook | G10L 15/183 704/275 |
| 2017/0187796 A1* | 6/2017 | Bragstad | H04L 67/1008 |
| 2017/0364450 A1* | 12/2017 | Struttmann | H04L 9/3297 |
| 2017/0364702 A1* | 12/2017 | Goldfarb | H04L 63/1408 |
| 2019/0182119 A1* | 6/2019 | Ratkovic | H04L 43/06 |
| 2019/0286774 A1* | 9/2019 | Nannicini | G06T 11/206 |
| 2019/0340532 A1 | 11/2019 | Ducore et al. | |
| 2019/0370407 A1* | 12/2019 | Dickie | G06F 16/9024 |
| 2021/0132757 A1* | 5/2021 | Golub | G06F 8/34 |
| 2021/0406151 A1 | 12/2021 | Durazzo et al. | |
| 2022/0058052 A1* | 2/2022 | Birnbaum | G06F 9/4881 |
| 2023/0196157 A1 | 6/2023 | Jin et al. | |

OTHER PUBLICATIONS

Laymann F. et al, "Hybrid Quantum Applications Need Two Orchestrations in Superposition: A Software Architecture Perspective," ArXi, 2021, pp. 1-15.

Salm M. et al, "A Roadmap for Automating the Selection of Quantum Computers for Quantum Algorithms.," Communications in Computer and Information Science, vol. 1310, 2020, pp. 66-85.

Sim S. et al, "A framework for algorithm deployment on cloud-based quantum computers," ArXiv, 2018, pp. 1-10.

Weder B. et al, "Integrating quantum computing into workflow modeling and execution," in Proceedings—2020 IEEE/ACM 13th International Conference on Utility and Cloud Computing, 2020, pp. 1-14.

Weder B. et al, "The Quantum software lifecycle," in—Proceedings of the 1st ACM SIGSOFT International Workshop on Architectures and Paradigms for Engineering Quantum Software, 2020., pp. 1-8.

Wild K. et al, "TOSCA4QC: Two Modeling Styles for TOSCA to Automate the Deployment and Orchestration of Quantum Applications," in Proceedings—2020 IEEE 24th International Enterprise Distributed Object Computing Conference, 2020, pp. 1-11.

Xanadu, "PennyLane," Quantum machine learning, Retrieved at https://pennylane.ai/qml/, Retrieved on March 2022, pp. 1-2.

Zapata, "Orquestra," Retrieved at https://docs.orquestra.io/, Retrieved on 2021, p. 1.

"Diffusion models explained. How does OpenAI's GLIDE work?", Accessed Oct. 2022, https://www.youtube.com/watch?v=344w5h24-h8&ab_channel=AICoffeeBreakwithLetitia.

Covalent, https://www.covalent.xyz/, 2023.

IBM Qiskit, Transpiler, 2023, https://docs.quantum.ibm.com/api/qiskit/transpiler.

Qiskit Dell Runtime, 2022, https://github.com/qiskit-community/qiskit-dell-runtime.

Weder et al., Automated Quantum Hardware Selection for Quantum Workflows, Apr. 20, 2021, Electronics, MDPI, 1-18, 10, 984, https://www.mdpi.com/journal/electronics.

https://www.tekdis.co.uk/insights/post/industrial-computer-product-selection-guide-and-how-to-choose-an-industrial-pc, archived May 27, 2022 (Year: 2022).

\* cited by examiner

INTELLIGENT ORCHESTRATION OF CLASSIC-QUANTUM COMPUTATIONAL GRAPHS

FIELD OF THE INVENTION

Embodiments of the present invention generally relate to execution of hybrid quantum-classical workloads. More particularly, at least some embodiments of the invention relate to systems, hardware, software, computer-readable media, and methods for constructing and operating a framework that is able to determine an amount of resources for, and to optimize the execution of, hybrid quantum-classical computing workloads.

BACKGROUND

The problem of orchestrating hybrid quantum-classic workloads is currently being addressed through different initiatives in state-of-the-art research. From the perspective of quantum software and quantum component deployment, there are solutions that tackle software development cycle, compilation and deployment of quantum computing modules onto quantum hardware and the automatic selection of quantum hardware backend depending on the implementation of quantum circuits. Although these are foundational aspects of developing, deploying, and running quantum computing programs, they do not solve the orchestration problem on their own.

Xanadu Inc. develops quantum computing software and hardware. Their software library, PennyLane, enables the development and execution of complex hybrid quantum-classic workflows. Such workflows focus mainly on quantum machine learning problems in which a larger problem, represented by a hybrid quantum-classic computation graph, is solved by some optimization mechanism like those implemented in variational quantum algorithms and classical machine learning pipelines. PennyLane is purportedly capable of parallelizing computation across several classical and quantum processing units.

Another quantum computing company, Zapatta Computing, is focused on quantum software development. Particularly, Zapatta has developed the Orquestra orchestrator to manage the execution of quantum computing workflows. As presently understood however, Orquestra does not support the representation of a single problem as a hybrid quantum-classic workflow. Further, there does not appear to be any intelligence associated with the specification of the resources to be allocated. All resources must be manually specified in a manifest file, with associated risks of under-subscription, and over-subscription, of resources.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
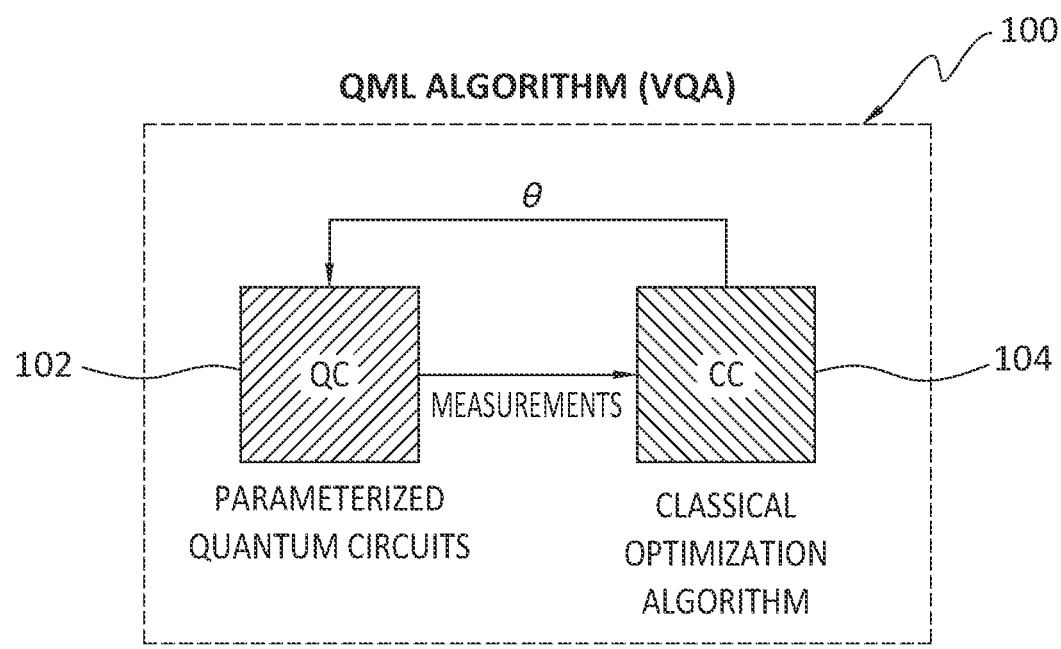
FIG. 1 discloses an example of a QML algorithm (VQA).

Embodiments of the present invention generally relate to execution of hybrid quantum-classical workloads. More particularly, at least some embodiments of the invention relate to systems, hardware, software, computer-readable media, and methods for constructing and operating a framework that is able to determine an amount of resources for, and to optimize the execution of, hybrid quantum-classical computing workloads.

In general, example embodiments of the invention may bring together both classical and quantum computing in a framework that is operable to decide the amount of resources for, and to optimize the execution of, hybrid quantum-classic computation problems. Example embodiments may leverage any available on-premises classical hardware for both classical computation and quantum simulation, and leverage any available quantum hardware for quantum computations to satisfy performance constraints and SLAs (service level agreements). Some embodiments employ an orchestration pipeline that receives a computation workflow in the form of a graph, and then alters the graph in such a way that each node of the graph contains the resource allocation configuration that is needed to execute the workflow while also satisfying SLA (service level agreement) constraints. Embodiments may leverage experimental observations about how quantum algorithms consume resources in simulation engines, and may use those experimental observations to build an estimation module that can estimate SLA metrics directly from parameters of the quantum computation.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that such embodiments may create and implement an intelligent orchestration engine that can estimate the amount of resources to be allocated for the execution of hybrid quantum-classic workflows in such a way as to satisfy SLA constraints. Further, an embodiment may enable identification, and optimal use of, both quantum, and classical, computing resources to solve hybrid quantum-classic workflows. Various other advantages of example embodiments of the invention will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

While quantum computing vendors are now selling their hardware to customers interested in experimenting with quantum computers on-premises, such computers are still of limited scale. Their scale, however, is possibly large enough to run quantum computing modules of relatively low complexity, such as those found in hybrid algorithms. Nonetheless, quantum computing hardware is still expensive. As a result, it is unlikely that customers will purchase more than one unit for their on-premises infrastructure.

Customers that buy quantum computing hardware are typically interested in solving problems of exponential complexity. As a result, these customers often already have the required on-premises classical HPC (high performance computing) infrastructure at their disposal. Such infrastructure can be used to execute quantum simulations up to a certain limit, which may be enough for running hybrid algorithms.

Hybrid quantum-classic algorithms have recently emerged as potentially being able to demonstrate the benefits of Quantum Machine Learning (QML) in the NISQ (Noisy Intermediate-scale Quantum) era. In such algorithms, parameterized quantum computing modules of relatively low complexity interact with classical computing modules to perform complex computations. Such interactions can be translated into a computation graph where nodes represent the computation modules and edges represent their interdependencies.

Example embodiments are directed to the implementation and use of an intelligent orchestration engine that can estimate the amount of resources to be allocated for the execution of hybrid quantum-classic workflows in such a way to satisfy SLA constraints. More particularly, example embodiments of the invention may bring together classical and quantum computing in a framework to decide the amount of resources for and to optimize the execution of hybrid quantum-classic computation graphs. An aim with such embodiments is to leverage any available on-premises classical hardware for both classical computation and quantum simulation and to leverage any available quantum hardware for quantum computations to satisfy performance constraints and SLAs. As such, example embodiments may employ an orchestration pipeline that receives computation workflow in the form of graph and alters this graph in such a way that each node contains the resource allocation configuration to execute the workflow and satisfy SLA constraints. Further, example embodiments may leverage experimental observations about how quantum algorithms consume resources in simulation engines and build an estimation module that can estimate SLA metrics directly from parameters of the quantum computation.

B. Aspects of Example Embodiments of the Invention

Despite the potential benefits claimed by quantum computing researchers, this new computing paradigm still largely depends and will most likely continue to depend on classical computing infrastructure for the purposes of control and communication between classical and quantum devices. As an example of this, and with reference to the example QML algorithm 100 of FIG. 1, in state-of-the-art QML (quantum machine learning), a parameterized quantum circuit 102 is optimized via a classic optimization algorithm 104 to obtain a, locally optimal, solution for a certain problem, as illustrated in FIG. 1. This type of arrangement is known as a VQA (variational quantum algorithm).

VQAs thus represent, by design, a hybrid quantum-classical computation. The quantum machine learning community hopes that VQAs will demonstrate quantum advantage in the NISQ era. This is because VQAs potentially allow quantum circuits to be shallower, that is, require fewer steps to be performed, than other so-called traditional quantum algorithms that require circuits with, possibly, thousands of quantum gates. Deep quantum circuits are problematic due to the inherent noise and low decoherence of NISQ computing devices. As a result, the optimization approach of VQAs may allow some problems to be solved with shallow circuits that are optimized for them.

Figure 2:
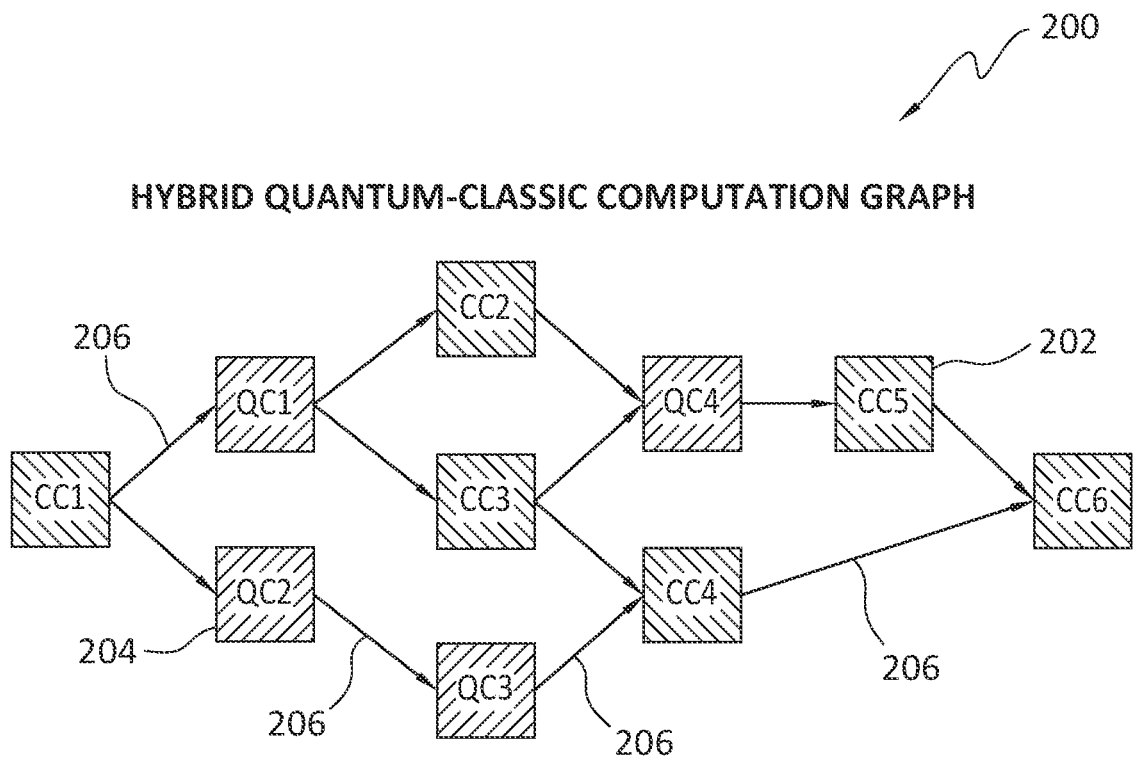
FIG. 2 discloses an example quantum-classic computation graph such as may be generated and used in example embodiments of the invention.

A follow-up of VQAs is the combination of several quantum and classical computing modules to solve more complex problems, as illustrated in the example hybrid quantum-classic computation graph 200 and workflow that is disclosed in FIG. 2. As shown, the example graph 200 includes a combination of classic computing modules, represented by nodes 202, and quantum computing modules, represented by nodes 204. The various nodes 202/204 may be connected to each other in different arrangements with one or more edges 206 that represent interdependences between/among the connected nodes 202/204. Note, with respect to the example of FIG. 2, that the same set of nodes 202/204 may be connected in any of a variety of different ways, depending on the problem(s) to be solved. In purely quantum computing implementations, such problems would probably require intractable circuit depths. By building, according to example embodiments of the invention, a hybrid workflow in which a complex solution may be developed from a combination of simpler quantum and classic computation steps, the quantum computing pieces may even be executed in simulation engines running on classical devices.

In effect then, entities interested in quantum computing typically are interested in solving problems of exponential complexity. As a result, those entities often already have the required on-premises classical HPC infrastructure at their disposal. Such infrastructure can be used to execute quantum simulations up to a certain limit, which may be enough for running hybrid algorithms with relatively shallow quantum circuits.

B.1 Hybrid Quantum-Classic Workflow Orchestrator

Figure 3:
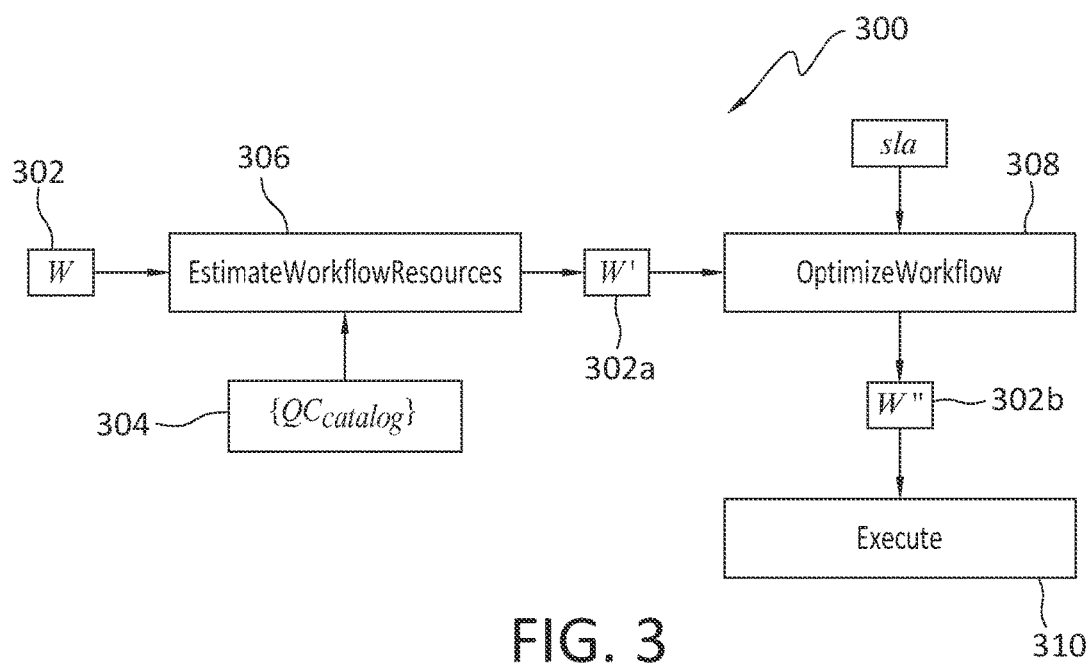
FIG. 3 discloses an overall structure of an example HQCW orchestrator according to some embodiments.

With reference now to the example workflow and pipeline 300 of FIG. 3, example embodiments of the invention may assume that a hybrid quantum-classic workflow is represented by graph $\mathcal{W}=\{\mathcal{N}_q, \mathcal{N}_c, \varepsilon\}$, where $\mathcal{N}_q$, $\mathcal{N}_c$ are the sets of quantum and classical nodes, respectively, and $\varepsilon$ is the set of edges connecting the nodes. Example embodiments may then operate to decide on the resources to be allocated to each node of the graph and to optimize its execution, in order to satisfy SLA constraints.

The pipeline 300 may receive, as input, the workflow graph 302 and a catalogue 304 of all quantum computing instances available in a hybrid quantum-classic computation infrastructure. Such computation instances may be simulation engines or quantum computing devices. The latter may be available on-premises and/or in a cloud computing environment.

The pipeline 300 may then transform the input workflow graph 302 twice. The first transformation, denoted at $\mathcal{W}'$, of the graph may be referred to as a 'first graph transformation,' and the second transformation, denoted at $\mathcal{W}''$, of the graph may be referred to herein as a 'second graph transformation.' Note that the second transformation is performed on $\mathcal{W}'$ to obtain $\mathcal{W}''$. Thus, the first and second transformations are serial transformations.

In the first stage of the pipeline 300, which may be carried out by a module 306, of the pipeline, EstimateWorkflowResources, each graph node (see example nodes 202 and 204 in FIG. 2) of the input workflow graph 302 is assigned all candidate resource allocation configurations, given quantum circuit parameters, and estimations of SLA metrics for the execution of the graph node with the candidate configuration. Thus, the output of the stage 306 is an interim workflow graph 302a ($\mathcal{W}'$), which is a transformation of the input workflow graph 302 ($\mathcal{W}$). That is, the interim workflow graph 302a has been transformed, at the first stage, to include candidate resource allocations for each node of the workflow graph 302.

In the OptimizeWorkflow stage, which may be carried out by an optimizer module 308, an optimization algorithm is executed to transform the interim workflow graph 302a to obtain a specific resource allocation configuration for each node so that the provided global SLA constraint is satisfied. That is, the transformation of interim workflow 302a ($\mathcal{W}'$), so as to generate the final graph 302b $\mathcal{W}''$ with the selected resource allocations, may comprise selecting, for each node, a specific resource allocation for that node. The final graph 302b $\mathcal{W}''$ with the selected resource allocations may then be provided as an input to the Executestage, which may be carried out by a module 310. Some embodiments may employ an execution scheduler, of the type used in a containerization engine for example, to perform the execution of the workflow using the specified resources.

B.2 Resource Allocation Estimator

An objective of example embodiments of the invention is to enable a workflow execution engine to allocate the right type and amount of computing resources for each step of a workflow. While there are solutions for this problem in classical computing, such conventional solutions are not suited for use in hybrid quantum-classic settings.

Figure 4:
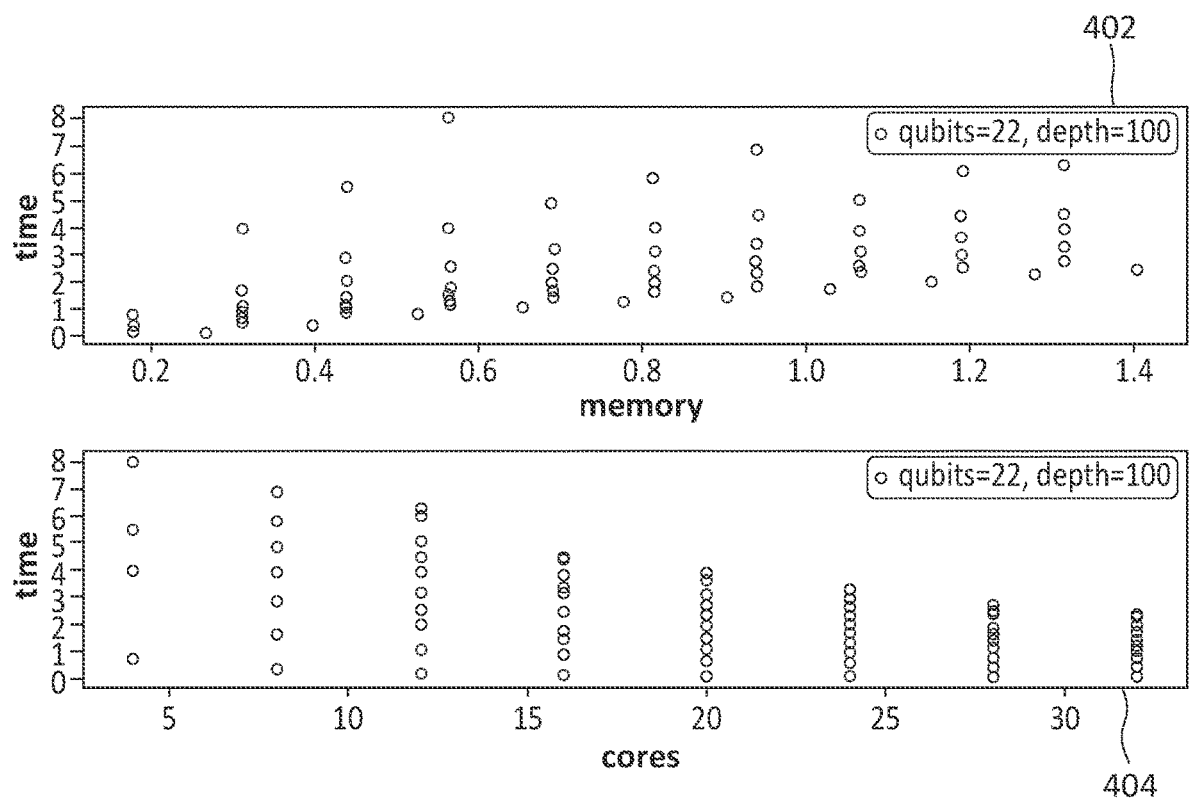
FIG. 4 shows collected data from quantum algorithm executions in a simulation environment.

Through their experimentation, the inventors have discovered that, in quantum simulations, the amount of resources used by a quantum algorithm is related to the number of qubits and the depth of the associated quantum circuit. By executing the same quantum algorithms several times with different resource allocation configurations, the impact of each configuration on SLA metrics such as execution time, and cost, for example, can be measured. These executions of the quantum algorithms generate large amounts of data that can be used to learn a function $m=f_{sim}(Q, D, R|QC_{sim})$, where m is an SLA metric of interest, Q is the number of qubits of the quantum circuit of the algorithm, D is the circuit depth, and R is the resource allocation configuration for a given quantum simulation instance $QC_{sim}$, that is, for a single given run of the quantum algorithm. The configuration may translate into, but is not limited to, a grouping of specific numbers and types of resources such as, for example, the number of CPU cores, the amount of memory, the amount of disk allocated to the process, container, or virtual machine, that runs the quantum algorithm. FIG. 4 shows example graphs 402 and 404 of data collected from the execution of a quantum algorithm on a simulation environment. More specifically, FIG. 4 discloses collected data from quantum algorithm executions on a simulation environment. The graphs 402 and 404 respectively show, for a given {qubits, depth} quantum circuit configuration, the SLA metric "execution time" as a function of the allocated memory, and of the number of CPU cores assigned to the simulation engine execution.

The case with estimating SLA metrics for a true quantum device is somewhat different that just described. Although SLA metrics in quantum devices are also affected by the number of qubits and depth of algorithm, the concept of resource allocation above does not directly apply. Other factors, such as queuing time, data loading times and required number of measurements of outputs affect execution times and costs. Still, data such as that in FIG. 4 can also be collected to model a function $m=f_{QC}(Q, D|QC_{dev})$, which measures an SLA metric as a function of the execution of a quantum circuit on a given quantum device $QC_{dev}$.

Figures 5, 6:
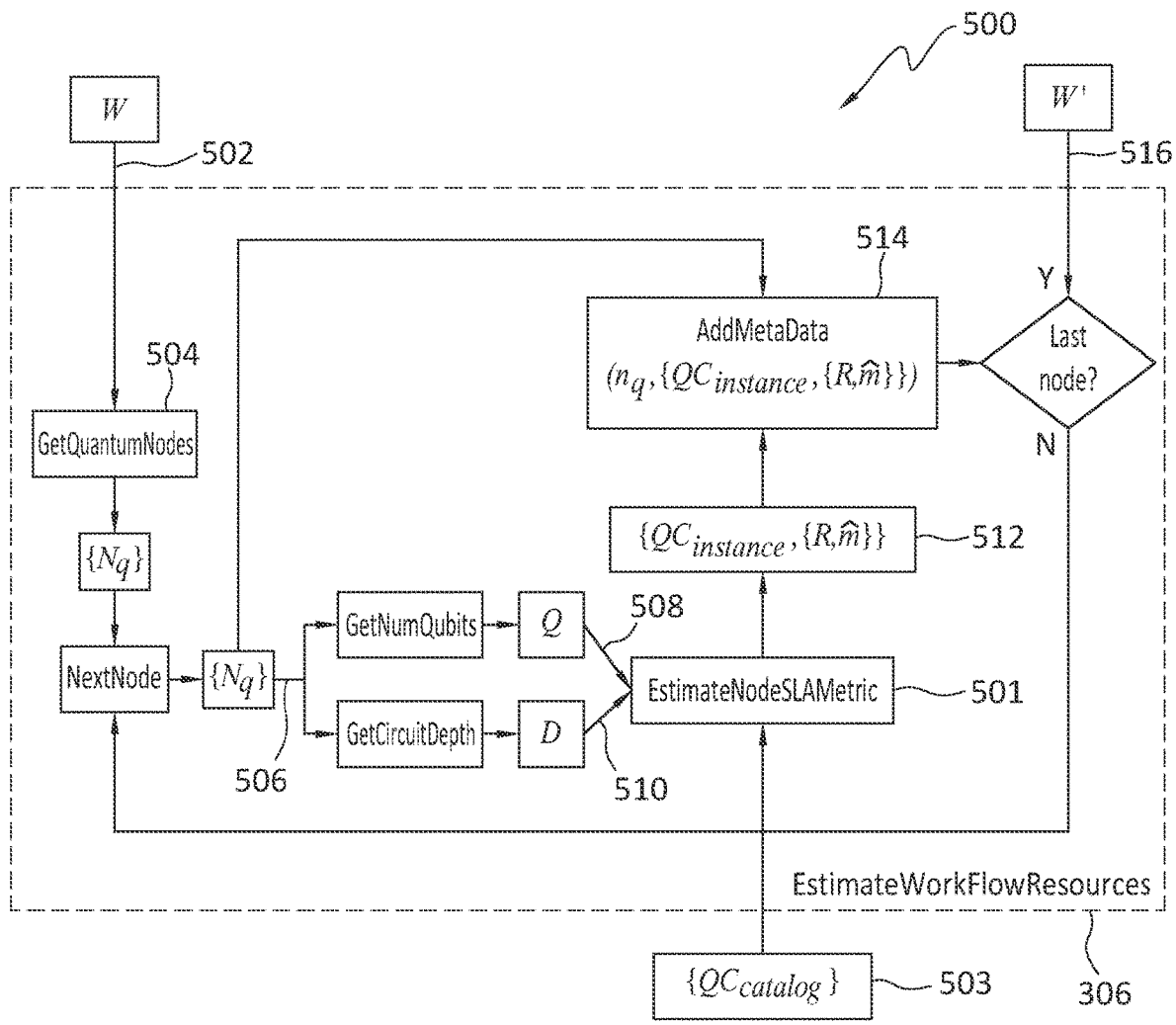
FIG. 5 shows an example flowchart of a resource allocation module of an HQCW orchestrator.
FIG. 6 discloses aspects of an example catalogue of available quantum computing instances in a computing environment.

Assuming that such execution data have been collected and that the mapping functions have been modelled, those data can be used in an SLA metric estimation process as the example method 500 disclosed in FIG. 5. In general, the method 500 comprises details concerning the operation of the module 306 EstimateWorkflowResources (see FIG. 3). That is, FIG. 5 discloses a flowchart of the resource allocation module of the HQCW orchestrator.

Particularly, in the method 500, the module 306 receives, as input, a workflow graph $\mathcal{W}$ and starts by obtaining 504 a set of quantum computing nodes of that graph $\mathcal{W}$. For each node $\mathcal{N}_q$, the module 306 may extract 506 the number of qubits and the depth of the of quantum circuit associated with the quantum algorithm implemented in that node. This information can be obtained directly from the code or via code instrumentation, tools for which presently exist.

The EstimateNodeSLAMetric process 501 may receive the number of qubits 508 and the depth of the quantum circuit 510, alongside a catalogue 503 of all quantum computing instances available in the given hybrid infrastructure. This catalogue 503 contains descriptions of either the quantum simulation engines or the quantum computing devices and the SLA metric estimation functions learned from execution data, as explained earlier herein. The representation 600 of an example catalogue is shown in FIG. 6.

With continued reference to FIG. 5, the EstimateNodeSLAMetric process thus generates 512 estimations of SLA metric $\hat{m}$ for each quantum computing instance, $QC_{instance}$, and the set of possible resource allocation configurations R, when the quantum computing instance is a simulation engine. Those estimations may be added 514 as metadata to the current workflow node being processed. When all quantum computing nodes of the graph are processed, the module 306 may then generate 516, and output, a modified version $\mathcal{W}'$ of the input workflow $\mathcal{W}$ (see reference 302 in FIG. 3).

Figure 7:
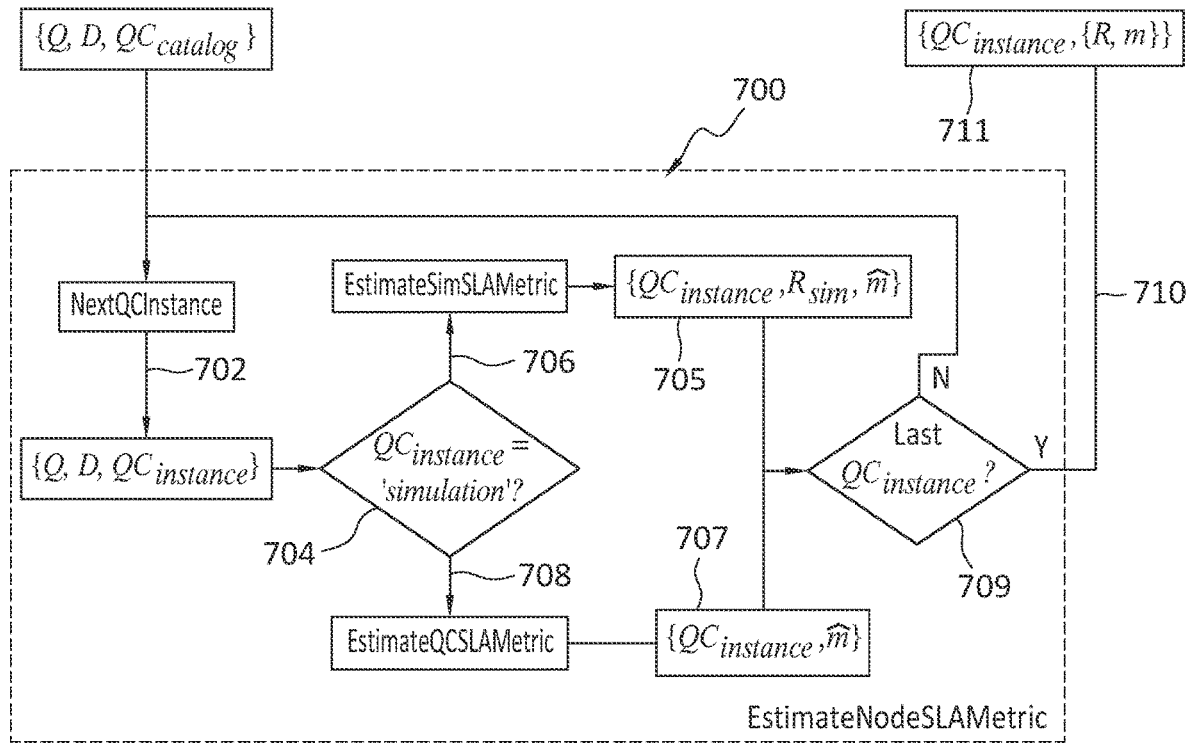
FIG. 7 shows an example flowchart of an SLA metric estimation module of an HQCW orchestrator.

Turning now to FIG. 7, further details are disclosed concerning the EstimateNodeSLAMetric process 501, where such details are denoted generally as a method 700 executable to carry out the general process 501. That is, FIG. 7 discloses a flowchart of the SLA metric estimation module of the HQCW orchestrator.

Initially, after obtaining 702 a quantum computing instance from the catalogue, the method 700 checks 704 if the instance refers to a quantum simulation engine. If so, estimations 705 of SLA metrics are obtained 706 for all possible resource allocation configurations available for the engine, given the extracted number of qubits and depth of the quantum circuit. If not, SLA metric estimations 707 are obtained 708 for the associated quantum computing device. Note that, by knowing the number of qubits and the circuit depth, the estimation of $\hat{m}$ is simplified because all other {Q, D} configurations are filtered out. After the method 700 has run for all the quantum computing instances in the catalog, which may be determined by the check 709, all estimations of all instances may then be aggregated 710 into a data structure, which may be associated to the graph node as metadata 711.

Figure 8:
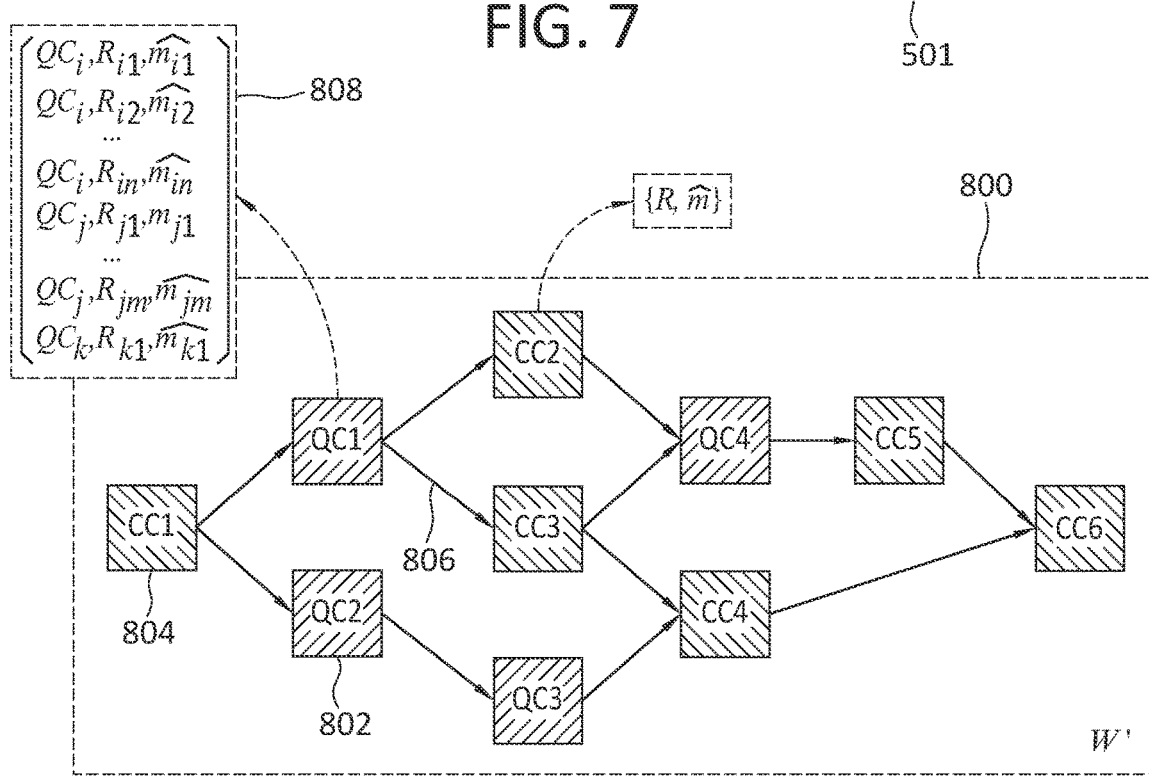
FIG. 8 shows quantum and classical computing nodes after SLA metric estimation of resource allocation configurations.

Turning next to FIG. 8, a modified workflow $\mathcal{W}'$ 800, including quantum nodes 802 and classical nodes 804, after SLA metric estimation of resource allocation configurations, is disclosed. The modified workflow $\mathcal{W}'$ 800 is an example of output 302a that may be generated by the module 306, using an input workflow $\mathcal{W}$ 302 (see FIG. 3).

As shown, dependencies between nodes are indicated by edges 806. In at least some instances, a downstream node may be dependent on any node(s) upstream of it. For example, node 'QC2' is dependent on node 'CC1,' and node 'CC3' is dependent on 'QC1' and 'CC1.' In the end, each graph node will be associated with candidate resource allocation configurations for its execution, as illustrated in FIG. 8. For example, node 'CC1' is associated with a group 808 of candidate resource allocation configurations. Note that the classical computing nodes of the graph may be processed using a process similar to the method 700.

B.3 Optimization

With each node of the computation graph containing, or otherwise being associated with, a respective list (see, e.g., reference 808 of FIG. 8) of candidate resource allocation configurations and associated SLA metric estimations, an optimizer module (see, e.g., reference 308 of FIG. 3) may then find the global resource allocation configuration, that is, the overall configuration for the entire graph, that satisfies the specified overall SLA constraint. For example, if the SLA constraint is the maximal expected execution time of the workflow, each node of the graph may contain an estimation of the execution time for each resource allocation configuration. The optimizer may then find the configuration that, with all execution times aggregated, satisfies the SLA constraint.

Figure 9:
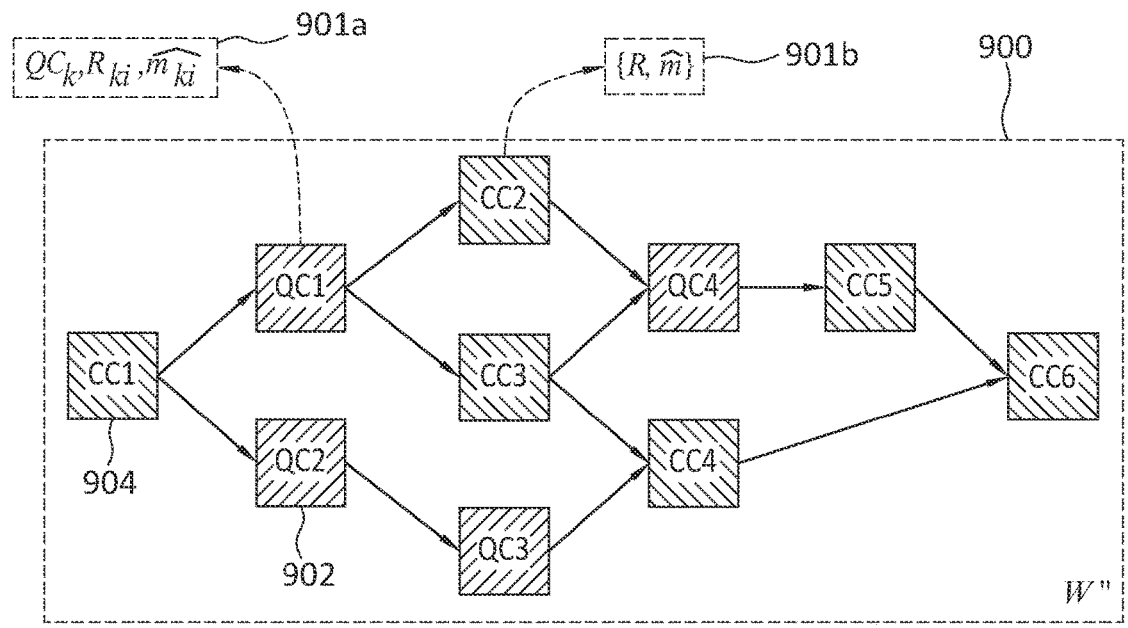
FIG. 9 shows an example output of an optimization module, with selected resource allocation configuration of each node.

To achieve this, the optimizer module may execute any shortest-path algorithm that considers graph traversal costs. The Dijkstra algorithm, for example, is a good candidate to achieve a graph configuration that will satisfy the SLA constraints. More specifically, the optimizer module receives, as input, the graph $\mathcal{W}'$ (see, e.g., reference 800 in FIG. 8), with all candidate resource allocation configurations, and generates, as output, a graph $\mathcal{W}''$, one example of which is denoted at 900 in FIG. 9, that includes a respective optimal resource allocation configuration, such as 901a and 901b for example, for each quantum node 902, and each classical node 904. Thus, the graph 900 comprises a configuration that will satisfy the SLA constraints. The determined optimal resource allocation configuration of each node may then be written on a manifest file or in any other format that can be processed by a workflow execution engine.

Note that, when considering the execution of the quantum computing module on a quantum computing instance QCi corresponding to a quantum computing device, the estimated SLA metric already encodes the expected queuing time, data encoding and measurement of the outputs. In this way, the optimizer module can decide whether to execute the quantum computation on a simulation engine, or directly on a quantum device.

B.4 Execution

With the final workflow configuration, that is, graph $\mathcal{W}''$, generated by the optimizer, the workflow may then be executed according to the resource allocation specifications. Example embodiments may employ a containerization engine and a scheduler that cooperate to execute the workflow. The containerization engine may submit jobs to a quantum computing device that is able to launch containerized quantum simulation engines.

Figure 10:
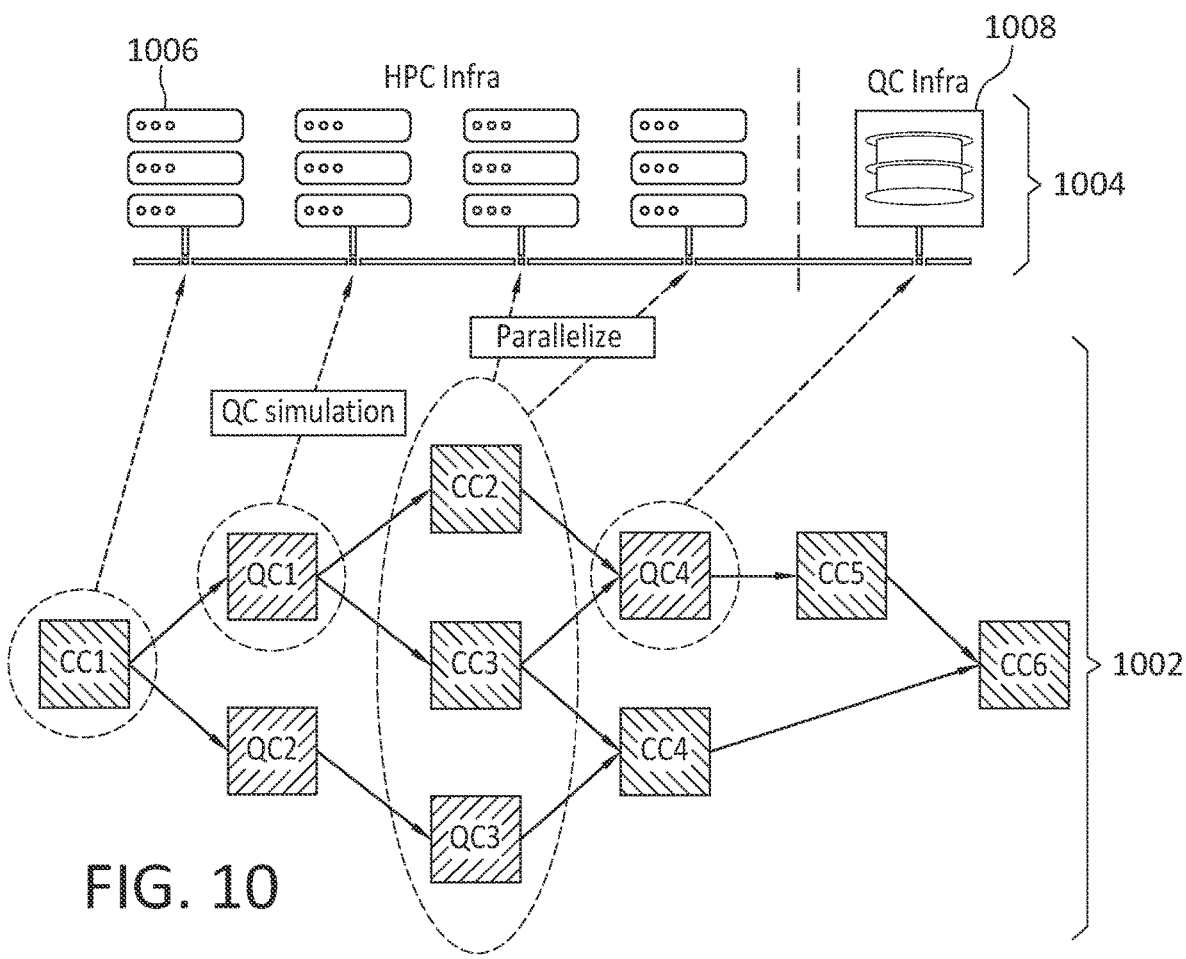
FIG. 10 shows an example execution of an HQCW graph on a hybrid classic-quantum computing infrastructure.

Note that the estimated global SLA metric obtained from the optimizer is an upper limit. The workflow execution engine is free to further optimize the execution of workflow. For instance, it may parallelize the execution of the computation modules, or even launch them on the same classical computing instance if the required resources are available, as illustrated in FIG. 10. Particularly, FIG. 10 discloses an example execution of a HQCW graph 1002 on a hybrid classic-quantum infrastructure 1004 that includes classical HPC computing resources 1006, and quantum computing resources 1008. As shown in this example, execution of a workload may involve any one, or more, of QC simulations on the classical HPC computing resources 1006, parallel performance of quantum, and classical, computing operations on the classical HPC computing resources 1006, and performance of quantum operations on the quantum computing resources 1008.

C. Example Methods

It is noted with respect to the example methods of FIGS. 3, 5, and 7, that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

The methods, processes, and operations, disclosed herein may be performed, for example at a cloud computing site, on-premises at an entity site, or performed at a combination of these sites. Further, other embodiments may be performed (aaS) as a service to which clients or users may subscribe. This service may be hosted locally, on-premises, or remotely at a cloud computing site, for example. Note however, that no particular embodiment is required to be implemented by any particular entity or entities. Still other embodiments of the methods, processes, and operations, disclosed herein may be performed within a hybrid classic-quantum computing environment, or on a stand-alone basis as an entity that is able to communicate with a hybrid classic-quantum computing environment.

D. Further Example Embodiments

Following are some further example embodiments of the invention. These are presented only by way of example and are not intended to limit the scope of the invention in any way.

Embodiment 1. A method, comprising: receiving a computation workflow defined by a graph that includes a group of computing nodes comprising quantum computing nodes; receiving a catalogue of quantum computing instances that are available in a hybrid classic-quantum computation infrastructure; transforming the graph to create a first graph transformation, and each of the quantum computing nodes is assigned a respective candidate resource allocation that identifies candidate resources operable to execute a respective quantum algorithm associated with that quantum computing node, wherein the transforming is performed using information from the catalogue, and wherein each quantum computing node is assigned the respective candidate resource allocation based on one or more given quantum circuit parameters, and based on a service level agreement estimation for execution of a function that is associated with that quantum computing node; and optimizing the computation workflow by selecting, for each of the quantum computing nodes, a resource from the candidate resource allocation associated with that quantum computing node, and the optimizing comprises transforming the first graph transformation to create a second graph transformation, and the second graph transformation comprises the selected resources for each node.

Embodiment 2. The method as recited in embodiment 1, wherein the second graph transformation is output to an execution module for execution in the hybrid classic-quantum computation infrastructure.

Embodiment 3. The method as recited in any of embodiments 1-2, wherein the catalogue identifies all quantum computing instances in the hybrid classic-quantum computation infrastructure, and one or more of the quantum computing instances is either a simulation engine, or a quantum computing device.

Embodiment 4. The method as recited in any of embodiments 1-3, wherein the quantum circuit parameters specify, for each node, aspects of a quantum circuit associated with a respective quantum algorithm implemented in that node, and the quantum circuit parameters comprise a number of qubits of the quantum circuit, and a circuit depth of the quantum circuit.

Embodiment 5. The method as recited in any of embodiments 1-4, wherein the group of nodes comprises classic computing nodes.

Embodiment 6. The method as recited in any of embodiments 1-5, wherein the selecting of resources is performed based on experimental observations about resource consumption by the respective quantum algorithms associated with each quantum computing node.

Embodiment 7. The method as recited in any of embodiments 1-6, wherein the second graph transformation is based on requirements specified in a service level agreement, and the second graph transformation identifies an overall hybrid classic-quantum configuration that is executable to satisfy the service level agreement.

Embodiment 8. The method as recited in any of embodiments 1-7, wherein the second graph transformation defines an overall algorithm which, when executed, performs one or more functions according to a service level agreement.

Embodiment 9. The method as recited in any of embodiments 1-8, wherein the selected resources specified in the second graph transformation are operable to execute respective quantum algorithms associated with each quantum computing node so that all execution times of the quantum algorithms aggregated together define an overall execution time that is within a time limit specified by a service level agreement.

Embodiment 10. The method as recited in any of embodiments 1-9, wherein the workflow graph further comprises classic computing nodes, and the optimizing further comprises selecting, for each of the classic computing nodes, a resource from a respective candidate resource allocation associated with that classic computing node.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon.

Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 11:
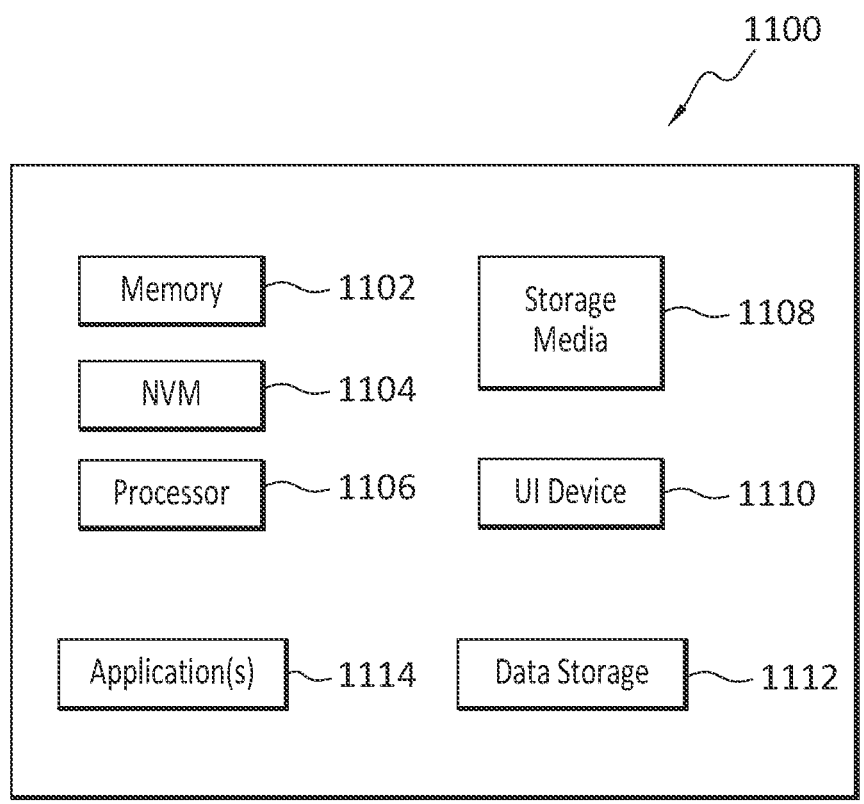
FIG. 11 discloses aspects of an example computing entity operable to perform any of the claimed methods, processes, and operations.

With reference briefly now to FIG. 11, any one or more of the entities disclosed, or implied, by FIGS. 1-10 and/or elsewhere herein, may take the form of, or include, or be implemented on, or hosted by, a physical computing device, one example of which is denoted at 1100. As well, where any of the aforementioned elements comprise or consist of a virtual machine (VM), that VM may constitute a virtualization of any combination of the physical components disclosed in FIG. 11.

In the example of FIG. 11, the physical computing device 1100 includes a memory 1102 which may include one, some, or all, of random access memory (RAM), non-volatile memory (NVM) 1104 such as NVRAM for example, read-only memory (ROM), and persistent memory, one or more hardware processors 1106, non-transitory storage media 1108, UI device 1110, and data storage 1112. One or more of the memory components 1102 of the physical computing device 1100 may take the form of solid state device (SSD) storage. As well, one or more applications 1114 may be provided that comprise instructions executable by one or more hardware processors 1106 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for optimizing execution of hybrid quantum-classical computing workloads, comprising:
    receiving a computation workflow defined by a graph that includes a group of computing nodes, which comprise quantum computing nodes and classic computing nodes, and edges representing interdependencies between the computing nodes, wherein each node comprises an estimation of an execution time for each resource allocation configuration;
    receiving a catalogue of quantum computing instances that are available in a hybrid classic-quantum computation infrastructure, wherein the catalogue identifies all quantum computing instances and classic computing instances in the hybrid classic-quantum computation infrastructure;
    transforming the graph to create a first graph transformation,
        wherein each of the quantum computing nodes is assigned a respective candidate resource allocation that identifies candidate resources operable to execute a respective quantum algorithm associated with that quantum computing node, wherein the transforming is performed using information from the catalogue, and
        wherein the transforming comprises:
            allocating to each quantum computing node the respective candidate resource based on one or more given quantum circuit parameters, and based on a service level agreement estimation for execution of a function that is associated with that quantum computing node;
determining whether a quantum computing instance in the respective candidate resource is a simulation engine or a quantum computing device; and
based on the determination, obtaining a service level agreement from a classic computing device or from the quantum computing device;
optimizing the computation workflow by selecting, for each of the quantum computing nodes, a configuration of resources from the candidate resource allocation based on all execution times, wherein the optimizing comprises transforming the first graph transformation to create a second graph transformation, and the second graph transformation comprises the selected configuration of resources for each node, which meets the service level agreement; and
executing, by classic computing instances or quantum computing instances of resources in the selected configuration based on the optimization, each of the quantum computing nodes in the second graph transformation.

2. The method as recited in claim 1, wherein the second graph transformation is output to an execution module for execution in the hybrid classic-quantum computation infrastructure.

3. The method as recited in claim 1, wherein the catalogue identifies all quantum computing instances in the hybrid classic-quantum computation infrastructure.

4. The method as recited in claim 1, wherein quantum circuit parameters specify, for each node, aspects of a quantum circuit associated with a respective quantum algorithm implemented in that node, and the quantum circuit parameters comprise a number of qubits of the quantum circuit, and a circuit depth of the quantum circuit.

5. The method as recited in claim 1, wherein the selecting of resources is performed based on experimental observations about resource consumption by the respective quantum algorithms associated with each quantum computing node.

6. The method as recited in claim 1, wherein the second graph transformation is based on requirements specified in a service level agreement, and the second graph transformation identifies an overall hybrid classic-quantum configuration that is executable to satisfy the service level agreement.

7. The method as recited in claim 1, wherein the second graph transformation defines an overall algorithm which, when executed, performs one or more functions according to a service level agreement.

8. The method as recited in claim 1, wherein the selected resources specified in the second graph transformation are operable to execute respective quantum algorithms associated with each quantum computing node so that all execution times of the quantum algorithms aggregated together define an overall execution time that is within a time limit specified by a service level agreement.

9. The method as recited in claim 1, wherein the workflow graph further comprises classic computing nodes, and the optimizing further comprises selecting, for each of the classic computing nodes, a resource from a respective candidate resource allocation associated with that classic computing node.

10. A non-transitory storage medium having stored therein instructions that are executable by one or more hardware processors to perform operations for optimizing execution of hybrid quantum0classical computing workloads, the operations comprising:

receiving a computation workflow defined by a graph that includes a group of computing nodes, which comprise quantum computing nodes and classic computing nodes, and edges representing interdependencies between the computing nodes, wherein each node comprises an estimation of an execution time for each resource allocation configuration;
receiving a catalogue of quantum computing instances that are available in a hybrid classic-quantum computation infrastructure, wherein the catalogue identifies all quantum computing instances and classic computing instances in the hybrid classic-quantum computation infrastructure;
transforming the graph to create a first graph transformation,
wherein each of the quantum computing nodes is assigned a respective candidate resource allocation that identifies candidate resources operable to execute a respective quantum algorithm associated with that quantum computing node, wherein the transforming is performed using information from the catalogue, and
wherein the transforming comprises:
allocating to each quantum computing node the respective candidate resource based on one or more given quantum circuit parameters, and based on a service level agreement estimation for execution of a function that is associated with that quantum computing node;
determining whether a quantum computing instance in the respective candidate resource is a simulation engine or a quantum computing device; and
based on the determination, obtaining a service level agreement from a classic computing device or from the quantum computing device;
optimizing the computation workflow by selecting, for each of the quantum computing nodes, a configuration of resources from the candidate resource allocation based on all execution times, wherein the optimizing comprises transforming the first graph transformation to create a second graph transformation, and the second graph transformation comprises the selected configuration of resources for each node, which meets the service level agreement; and
executing, by classic computing instances or quantum computing instances of resources in the selected configuration based on the optimization, each of the quantum computing nodes in the second graph transformation.

11. The non-transitory storage medium as recited in claim 10, wherein the second graph transformation is output to an execution module for execution in the hybrid classic-quantum computation infrastructure.

12. The non-transitory storage medium as recited in claim 10, wherein the catalogue identifies all quantum computing instances in the hybrid classic-quantum computation infrastructure.

13. The non-transitory storage medium as recited in claim 10, wherein quantum circuit parameters specify, for each node, aspects of a quantum circuit associated with a respective quantum algorithm implemented in that node, and the quantum circuit parameters comprise a number of qubits of the quantum circuit, and a circuit depth of the quantum circuit.

14. The non-transitory storage medium as recited in claim 10, wherein the selecting of resources is performed based on experimental observations about resource consumption by the respective quantum algorithms associated with each quantum computing node.

15. The non-transitory storage medium as recited in claim 10, wherein the second graph transformation is based on requirements specified in a service level agreement, and the second graph transformation identifies an overall hybrid classic-quantum configuration that is executable to satisfy the service level agreement.

16. The non-transitory storage medium as recited in claim 10, wherein the second graph transformation defines an overall algorithm which, when executed, performs one or more functions according to a service level agreement.

17. The non-transitory storage medium as recited in claim 10, wherein the selected resources specified in the second graph transformation are operable to execute respective quantum algorithms associated with each quantum computing node so that all execution times of the quantum algorithms aggregated together define an overall execution time that is within a time limit specified by a service level agreement.

18. The non-transitory storage medium as recited in claim 10, wherein the workflow graph further comprises classic computing nodes, and the optimizing further comprises selecting, for each of the classic computing nodes, a resource from a respective candidate resource allocation associated with that classic computing node.

* * * * *

UNITED STATES PATENT AND TRADEMARK OFFICE
CERTIFICATE OF CORRECTION

| | |
|---|---|
| PATENT NO. | : 12,386,672 B2 |
| APPLICATION NO. | : 17/648065 |
| DATED | : August 12, 2025 |
| INVENTOR(S) | : Rômulo Teixeira de Abreu Pinho et al. |

It is certified that error appears in the above-identified patent and that said Letters Patent is hereby corrected as shown below:

In the Specification

<u>Column 5</u>
Line 67, change "Executestage" to – Execute stage –

<u>Column 6</u>
Line 63, change "workflow graph $W$" to – workflow graph 502 $W$ –
Line 64, change "that graph $W$" to – that graph 502 $W$ –

Signed and Sealed this
Thirtieth Day of December, 2025

John A. Squires
*Director of the United States Patent and Trademark Office*